Sept. 8, 1970        H. W. KRANER        3,527,944
MULTIPLE SEMI-CONDUCTOR RADIATION DETECTORS
WITH COMMON INTRINSIC REGION
Filed Oct. 10, 1968

INVENTOR.
HOBART W. KRANER
BY

United States Patent Office 3,527,944
Patented Sept. 8, 1970

3,527,944
MULTIPLE SEMI-CONDUCTOR RADIATION DETECTORS WITH COMMON INTRINSIC REGION
Hobart W. Kraner, Bellport, N.Y., assignor to the United States of America as represented by the United States Atomic Energy Commission
Filed Oct. 10, 1968, Ser. No. 766,433
Int. Cl. G01f 1/24; H01l 15/00
U.S. Cl. 250—83      4 Claims

ABSTRACT OF THE DISCLOSURE

A lithium drifted germanium gamma ray detector to eliminate unwanted Compton interactions having an outer doped region with spaced contacts and grooves separating said contacts from electrical connection. In one form a common doped contact is separated from the spaced contacts by the intrinsic region. Incomplete Compton interactions appear randomly and singly on the spaced contacts and can be eliminated. Multiple Compton interactions in which the full gamma energy is absorbed appear as coincident pulses which are passed for spectral analysis.

BACKGROUND OF THE INVENTION

Prior to the development of semi-conductor counter devices, the detection and measurement of radiation was carried out principally in gaseous ionization chambers and scintillation detectors. The application of solid state counting devices to the measurement of radiation made it possible, due to their greater density and stopping power, to achieve complete absorption in much smaller volumes while at the same time obtaining greater energy resolution.

In the detection of gamma radiation, lithium-drifted germanium detectors have been produced which have relatively large volumes sensitive to gamma rays. The germanium produces the electrical impulses in response to the incident gamma radiation while the diffused lithium acts to cancel or neutralize the effect of the acceptor-doping, the region containing the lithium thus being referred to as the compensated region. The resulting pIn detector is an excellent device for detecting and measuring gamma radiation and is finding widespread use in a variety of applications including that of neutron activation analysis.

The germanium compensated detector is particularly useful for detecting gamma rays in the Compton scattering range, i.e., 0.2 to 2 mev. As is understood in the art, from the pattern or distribution of energy peaks recorded by the detector it is possible to identify a radioactive isotope which emits gamma rays. The detector emits a charge pulse for each interaction, the charge being proportional to the energy lost in the interaction. These pulses are counted and are graphically displayed on a graph of intensity versus energy. The presence of incomplete Compton scatterings, such as occurs when the gamma rays leaves the detector before complete degradation of the energy occurs, tends to blur or round off somewhat the otherwise sharp energy peaks and raises the level of background from which the peaks emerge. Ordinarily this effect does not detract sufficiently from the display to destroy the "footprints" of the radio-active sample.

However, where a mixture of samples is being analyzed for its constituents, this blurring effect due to the presence of incomplete Compton scatterings does render the job of separating the patterns more difficult. In certain applications, such as the detection of $Na^{24}$ and $Mn^{56}$ in liver in medical analysis, where the patterns of the constituents may have certain similarities, the problem of detecting the presence of the separate constituents becomes a difficult task at best and sometimes is virtually impossible.

SUMMARY OF THE INVENTION

The invention described herein was made in the course of, or under a contract with the United States Atomic Energy Commission.

The present invention makes it possible in a lithium drifted germanium detector to separate out incomplete Compton interactions from the complete ones and so makes it possible to eliminate unwanted signals which tend to obscure the patterns which exist when only the completed Compton interactions are detected and recorded.

When a photon of gamma rays in the Compton scattering range enters a detector a succession of interactions may occur until complete degradation of the energy of the original photon occurs. In many cases, the photon entering the crystal has one interaction only and then leaves the crystal. In any event, only complete interactions within the crystals delivers measurable energy which is significant from a detection point of view, and for the reasons already mentioned, it would be highly desirable to eliminate some or all of the incomplete Compton interactions from being measured or detected so that only more significant signals are obtained.

One of the characteristics of a complete Compton interaction is that the successive interactions making up a complete degradation of the energy in a gamma photon entering the crystal spreads or occurs throughout the whole crystal at virtually the speed of light so that contacts located at different points in the crystal will detect the presence of a photon simultaneously, and will appear in the readout as a coincident interaction, that is, the time interval is too small for recognition by the electronic instrumentation associated with the detector. In the case of an incomplete Compton interaction, such as in a single encounter where an energetic photon leaves the crystal, not all, and usually only one of the contacts would detect the interaction, and in the case of a group of separate "single shot" interactions, the various contacts would show the impulses to be random as to time, that is, not coincident.

In accordance with this invention, the aforementioned characteristics of the Compton interactions are utilized to eliminate many of the unwanted signals. This is accomplished by dividing the crystal into two or more detection zones or regions each having separate detection contacts and then passing only coincident interactions.

It is thus a principal object of this invention to eliminate or reduce unwanted signals from a gamma ray detector.

Other objects and advantages of this invention will hereinafter become obvious from the following description of preferred embodiments of this invention taken with reference to the accompanying drawing.

DESCRIPTION OF THE PREFERRED EMBODIMENT

Figure 1:
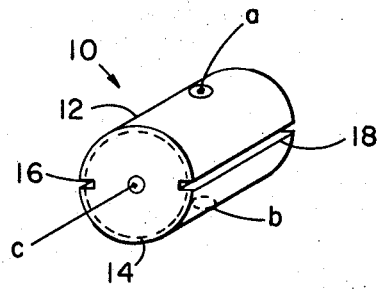
FIG. 1 is an isometric view of a detector with two discrete outer regions.

Referring to FIG. 1, detector 10 consists of a cylindrical section of lithium drifted or a compensated germanium crystal 12 whose outer doped region 14 indicated by the broken line is a donor or n-region. The volume within the broken line is an intrinsic region, preferably lithium drifted germanium. Detector 10 is provided with a pair of spaced surface contacts a and b, and a common contact c which would be an acceptor region if region 14 is donor, or vice versa. A pair of slots 16 and 18 along the length of section 12 are deep enough to render the annular doped region 14 discontiguous, that is, preventing electrical continuity between the outer contacts through the doped region. It is understood that the doped regions may be reversed and that other suitable materials may be employed.

Figure 2:
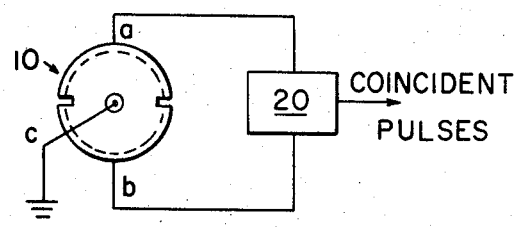
FIG. 2 is a schematic illustration of an arrangement for utilizing the detector of FIG. 1.

In the use of detector 10 just described, reference is made to FIG. 2 wherein detector 10 is connected by way of contacts a and b to circuitry 20 whereas common contact c is grounded. Circuitry 20 only passes pulses of energy which are received coincidently. Thus, when a gamma photon enters detector 10 a complete Compton interaction within the detector is received simultaneously by both contacts a and b so that circuitry 20 will pass such signals. In the event the photon enters detector 10 and leaves after a single interaction, only one of contacts a or b will pass a pulse. Groups of single Compton interactions will appear randomly at circuit 20, hence spaced apart in time, so that a large proportion of these pulses will not be passed, only those passing which randomly coincide with each other. Thus, as previously explained there will be a decreased output of unwanted signals with the result that the remaining passed signals will be a more accurate representation of the nature of the gamma rays entering detector 10 as described above.

Figure 3:
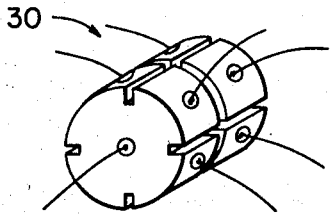
FIG. 3 is an isometric view of a detector with eight discrete outer regions.

For a detector having even greater discrimination reference is made to FIG. 3 wherein detector 30 is shown in which eight independent outer contacts are employed. Where a large number of single events occur a certain number will occur in pairs and pass as coincident signals. In this embodiment, it would take eight simultaneous pulses to produce a coincident pulse thereby resulting in even greater discrimination between complete and incomplete Compton interactions, or allow the use of less than eight but more than one simultaneous pulse thereby improving the detection sensitivity.

Figure 4:
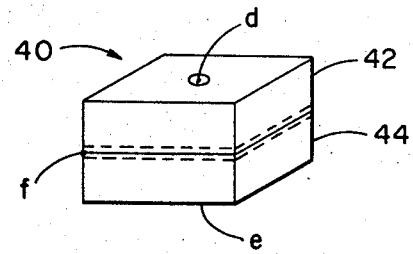
FIG. 4 is an isometric view of an alternative arrangement.

Under certain conditions it has been found that a pair of separate detectors may be utilized to carry out this invention. Referring to FIG. 4, detector 40 is seen to consist of a pair of discrete detectors 42 and 44 placed back to back with surface doped contacts d and e and common contact f connected to the adjoined surface doped regions indicated by the broken lines. The volumes outside of the broken lines are the compensated or intrinsic regions. It has been found that because the inactive (uncompensated) region separates the intrinsic region into separate parts the combined thickness of the uncompensated region within the broken lines must not exceed 50 microns. When the inactive region exceeds 50 microns, the absorption of scattered radiation reaches the level where decreased detection efficiency cancels out the benefits obtained by this invention. In the arrangement shown in FIG. 4, detector 40 is constructed by placing discrete detectors 42 and 44 in intimate contact against each other under slight pressure. With polished surfaces it is found that the device will function satisfactorily.

It is thus seen that there has been provided an improved gamma ray detector which reduces the appearance of incomplete Compton scatterings and thus presents a more accurate and sensitive picture of the gamma rays which are present. While only preferred embodiments have been described it is understood that many variations thereof are possible without departing from the principles of this invention. For example, while the arrangements described are all symmetrical in shape, asymmetrical constructions may be possible in particular applications. Hence the invention is to be defined only by the following claims.

I claim:
1. A semi-conductor detector for gamma rays having first and second doped regions separated by an intrinsic region comprising:
   (a) a pair of spaced contacts on said first doped region collecting gamma ray associated signals produced in said intrinsic region;
   (b) separating means formed in said first region preventing conduction between said contacts through said first region; and
   (c) a common electrical connection to said second doped region for completing an electrical circuit through said intrinsic region with each of said spaced contacts, said intrinsic region being common to said spaced contacts.

2. The detector of claim 1 in which the first doped region is along the outer periphery of said detector and the separating means consist of grooves extending completely through the first doped region.

3. The detector of claim 2 in which said detector is cylindrical and said spaced contacts and grooves are symmetrically disposed along the circumference of the detector.

4. The detector of claim 3 in which the intrinsic region is lithium drifted germanium.

References Cited

UNITED STATES PATENTS

| | | | |
|---|---|---|---|
| 3,043,955 | 7/1962 | Friedland et al. | 250—83.3 |
| 3,201,590 | 8/1965 | Sun | 250—83.3 |
| 3,293,440 | 12/1966 | Mueller | 317—23.5 |
| 3,351,758 | 11/1967 | Armantrout et al. | 250—83.3 |
| 3,432,919 | 3/1969 | Rosvold | 317—23.5 |

ARCHIE R. BORCHELT, Primary Examiner

M. J. FROME, Assistant Examiner

U.S. Cl. X.R.

250—83.3; 317—234